Feb. 25, 1969  C. O. F. FYRK  3,429,418
MIXING AND SPREADING APPARATUS
Original Filed July 13, 1966  Sheet 1 of 2

Inventor
Clas O. F. Fyrk
By McCanna, Morsbach & Pillote
Attys

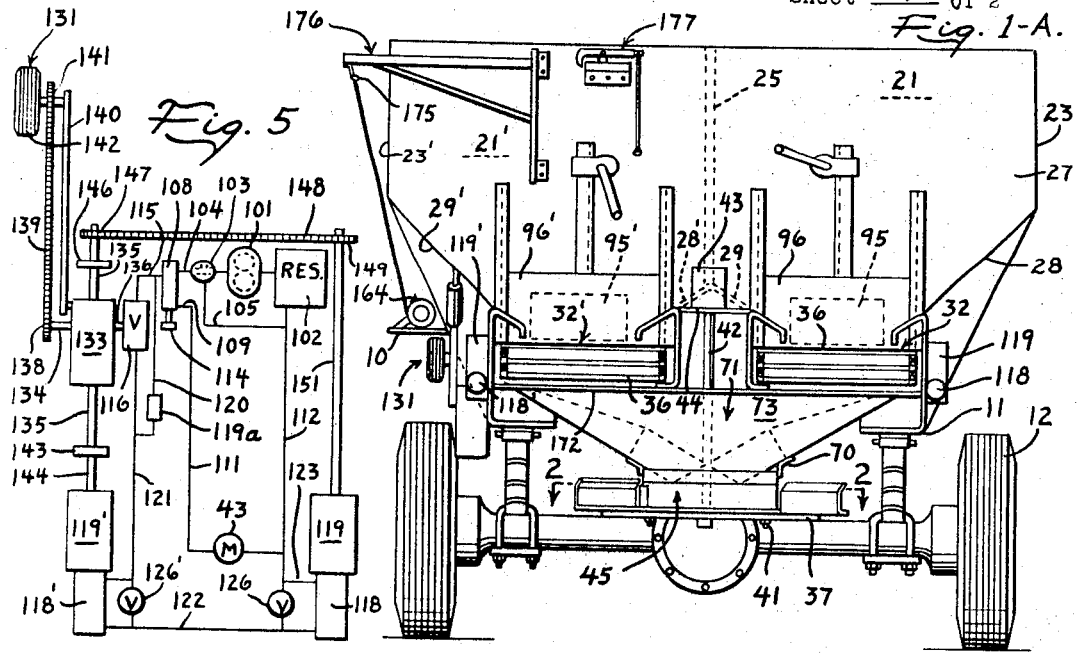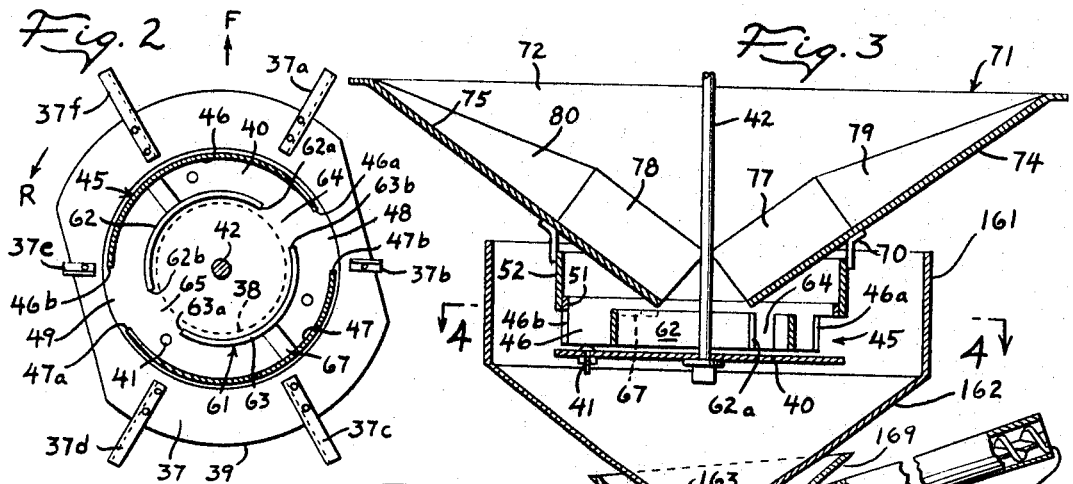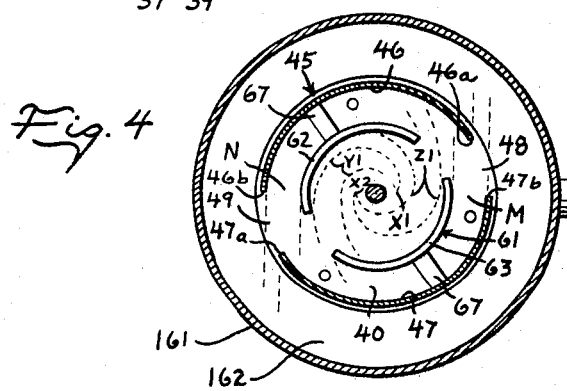

United States Patent Office 3,429,418
Patented Feb. 25, 1969

3,429,418
MIXING AND SPREADING APPARATUS
Clas O. F. Fyrk, Rockford, Ill., assignor to Swenson Spreader & Mfg. Co., Lindenwood, Ill., a corporation of Illinois
Continuation of application Ser. No. 564,976, July 13, 1966, which is a continuation-in-part of application Ser. No. 472,243, July 15, 1965. This application Dec. 13, 1967, Ser. No. 690,361
U.S. Cl. 198—98        15 Claims
Int. Cl. B65g 37/00, 67/24; B01f 15/02

ABSTRACT OF THE DISCLOSURE

A truck-mounted, two-compartment hopper having a conveyor in each compartment for feeding materials to a rotating disk. Inner and outer flow dividers above the disk to blend the materials thereon. Impellers removably mounted outwardly of the disk to spread the materials and a removably mounted housing operable when the impellers are removed to collect the blended materials. An auger-type conveyor to convey the materials from the housing to a discharge point.

---

Figure 1:
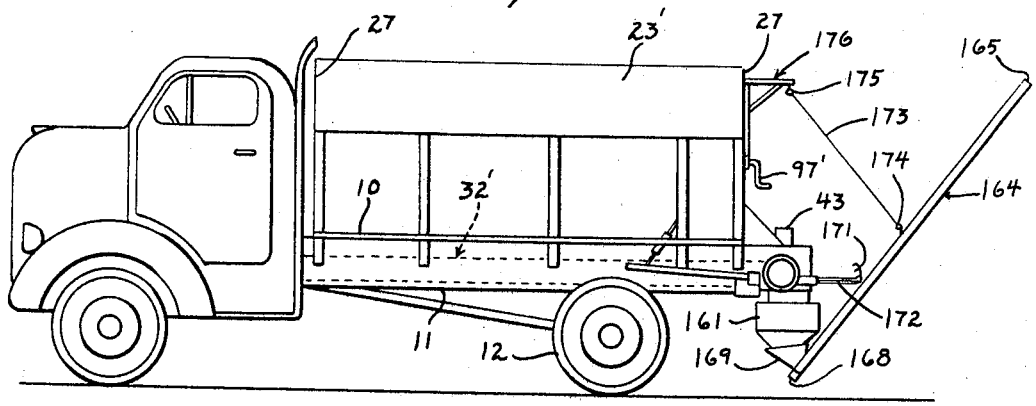
Figure 1:
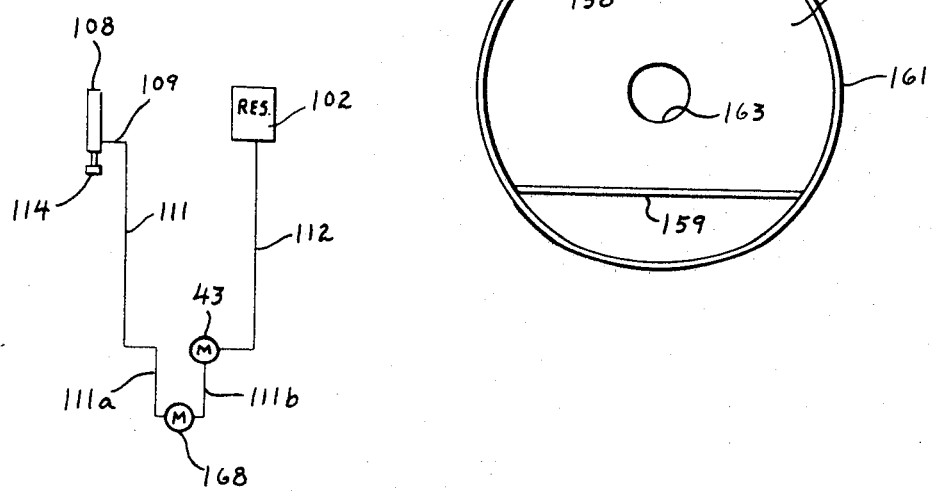

This is a continuation of my copending application Ser. No. 564,976, filed July 13, 1966 (now abandoned) and a continuation-in-part of application Ser. No. 472,243, filed July 15, 1965.

This invention relates in general to an apparatus for spreading materials over an area and for mixing or blending plural materials for spreading, and more particularly to a convertible mixing and spreading apparatus.

The present invention relates to an apparatus for mixing and spreading pulverulent, granular, pelletized or other materials, hereinafter generally referred to as particulate materials. The apparatus may, for example, be used for simultaneously spreading several of various different soil conditioning materials such as potash fertilizer, phosphate fertilizer, nitrate fertilizer, lime, etc. and may also be used for spreading several materials for conditioning highways and the like, such as sand, salt, etc. In the embodiment illustrated, the apparatus is arranged for simultaneously mixing and spreading two different materials, it being understood that the apparatus could be adapted for more than two materials.

It is frequently necessary, in the conditioning of soils, to apply several different soil conditioning materials, the type and the quantity of materials per acre varying with the different soils and crops to be grown on the soil. At present, it is a general practice to premix several fertilizer materials at mixing plants, and haul the premixed material to the place to be spread, and then spread the premixed material. This system has several disadvantages. Premixing requires special equipment to attain uniform mixing of the different materials and, if a number of different premixes are prepared for subsequent sale, it requires elaborate storage facilities for the different mixes. Further, the different materials to be spread generally have different specific gravities and particle size. The vibration incident to hauling the premixed material to the place of distribution causes significant gravitational separation of the different materials, and loss of uniformity of mix.

An important object of this invention is to provide a convertible apparatus for mixing and spreading plural materials which avoids the necessity of premixing and also avoids the problem of gravitational separation which occurs in premixed materials during transportation.

A further object of this invention is to provide an improved apparatus which will continuously blend or mix two or more particulate materials in any selected proportions.

A still further object of this invention is to provide an apparatus which is adaptable for continuously blending two or more particulate materials and delivering the same to a common outlet or for blending the materials and broadcast spreading the same.

These, together with other objects and advantages of this invention will be more readily appreciated as the invention becomes better understood by reference to the following detailed description when taken in connection with the accompanying drawings, wherein:

FIG. 1 is a side elevational view of a vehicle having the present invention applied thereto;
FIG. 1–A is a rear elevational view of the vehicle with the present invention arranged for blending and spreading;
FIG. 2 is a sectional view taken generally along plane 2—2 of FIG. 1–A;
FIG. 3 is a vertical sectional view through the apparatus of the present invention adapted for blending two or more materials and for delivering the materials to a common discharge;
FIG. 4 is a sectional view taken on plane 4—4 of FIG. 3;
FIG. 4–A is a top view of the housing shown in FIGS. 3 and 4; and
FIGS. 5 and 5–A are diagrammatic views of the hydraulic control system for the apparatus.

The convertible mixing and/or spreading apparatus of the present invention is adapted for use with various different types of vehicles including self-propelled vehicles and trailing-type vehicles. As shown herein, the spreader apparatus is applied to a truck-type vehicle having a frame 11, drive wheels 12, steering wheels, a motor for driving the vehicle, and driver control station in the cab. The truck is conventional and further detailed description is deemed unnecessary. Alternatively, the vehicle could be in the form of a trailer-type vehicle which is merely towed or pushed by another vehicle, if desired.

The apparatus of the present invention is arranged to blend or spread several different particulate materials and the several materials are not premixed but are instead maintained segregated from each other on the vehicle. For this purpose, plural material storage departments or hoppers are provided on the vehicle for receiving the different materials. As above, the vehicle is provided with two storage compartments designated 21 and 21' for two different materials, it being understood that additional storage compartments could be provided if desired. The storage compartments may be formed in any suitable manner and, as illustrated, are in the form of a V-box having spaced side walls 23 and 23', an intermediate wall 25, and end walls 27. Intermediate wall 25 separates the box into the aforementioned hoppers 21 and 21' and these hoppers have downwardly inclined bottom walls 28, 28' and 29, 29'. A feed means is provided for feeding material from the several storage compartments to the material blending and spreading apparatus. While it is possible to use a single conveyor which underlies both storage compartments, it is preferable to use separate conveyors such as shown at 32 and 32' for individually feeding the different materials. Conveyors 32 and 32' are conveniently of the endless type entrained over sprockets adjacent the front and rear of the respective hoppers. The bottom walls 28, 29 and 28', 29' define longitudinally extending openings therebetween to allow material to pass onto the upper run of the respective conveyor and the conveyors include spaced flights 36 for advancing the material lengthwise of the hoppers to the blending and spreader apparatus. As is conventional, plates or panels underlie the flights on the upper runs of the conveyors to support the material as it is advanced.

The spreader apparatus for spreading the materials is of the broadcast type and comprises a rotary broadcast member in the form of a generally flat ring 37 having inner and outer edges 38 and 39, respectively, and removably attached to a generally flat disk 40 as by fasteners 41. Ring 37 need not be limited to the shape illustrated in FIG. 2 and could be in the form of a circular plate; however, it is preferable that it be detachably mounted to disk 40 or shaft 42. In the embodiment illustrated, disk 40 is mounted as on a shaft 42 for rotation about a generally upright axis and is conveniently rotated by hydraulic motor 43. As shown in FIG. 1-A, the motor is located above the broadcast member and supported on a mounting plate 44 with the shaft extending downwardly from the motor. Alternatively, the drive motor could be located below the spreader.

The broadcast spreader apparatus is advantageously arranged to impel the material in two separate streams extending in relatively opposite directions. The broadcast member has vanes or impellers 37a–37f for throwing the material outwardly as the disk and ring are rotated and a material flow divider means is provided for delivering material to the impellers at approximately diametrically opposite locations on ring 37 and so located with respect to the path of travel of the vehicle as to cause the material to be thrown by the impellers in separate streams extending in relatively opposite directions and generally tangent to the front and rear sides of the ring. A material flow divider, designated generally 45, is disposed above disk 40 and includes opposed generally U-shaped wall portions 46 and 47 disposed at opposite sides of the axis of rotation of the broadcast member and having their lower edges extending closely adjacent the upper face of disk 40. The ends 46a and 46b of wall portion 46 are spaced from the ends 47b and 47a respectively of wall portion 47 to define material outlet or discharge openings 48 and 49 therebetween at approximately diametrically opposite locations on the disk. The discharge openings are located with respect to the direction of movement of the vehicle during spreading, indicated by arrow F in FIG. 2, and the direction of rotation of the ring indicated by curved arrow R, so that the material that passes out through the openings 48 and 49 is impelled in separate streams extending generally tangentially of the front and rear sides of the ring toward relatively opposite sides of the path of travel. The material will be carried circumferentially with the impeller vanes through an angle before being thrown off. It has been found that a good spread pattern can be achieved by locating one edge of the openings 48 and 49 defined by the edges 47b and 46b adjacent the plane through the axis of the disk and substantially normal the path of travel of the vehicle with the other edges 46a and 47a angularly spaced in the direction of rotation of the disk from edges 47b and 46b. For reasons pointed out hereinafter, the edges 47a and 46a of the openings 48 and 49 are advantageously so arranged that only a portion of the material carried by the disk along the wall portion 47 passes out through the opening 48 and, similarly, only a portion of the material carried by the disk along the wall portion 46 passes out through the opening 49. The material which does not pass out through each opening is carried to the other opening. In the preferred embodiment shown, edges 47a and 46a are angularly spaced in the direction of rotation approximately 35° from the other edges 47b and 46b of the openings 48 and 49. The openings extend above the disk a distance sufficient to accommodate the maximum depth of material on the disk and the material directing casing is shaped in the region above the opening to guide the material down to the disk. As shown in FIG. 3, wall portions 46 and 47 are connected by a generally annular wall portion 51 to form a unit. The unit is preferably mounted for a limited vertical adjustment to enable the lower edges of the wall portions 46 and 47 to extend into close adjacency to the upper face of the disk. For example, wall portion 51 may be adjustably secured to a generally annular support 52 in any convenient manner. Support 52 is stationary and is mounted in a manner described hereafter.

The rotary broadcast apparatus is advantageously so arranged that a single broadcast apparatus can be employed for spreading several materials and, alternatively, spreading only one material if desired. In employing two outlets for spreading the material in two relatively oppositely directed streams, it is necessary to assure that like amounts of each of the materials pass out through the separate outlet openings 48 and 49. For this purpose, an inner material flow divider designated generally by the numeral 61 is provided for delivering material to the inside of the outer material flow divider in two separate flows containing substantially like proportions of the several materials to be spread. The inner flow divider means includes a flow divider casing disposed in overlying relation to disk 40 inwardly of the outer flow divider 45. The inner flow divider casing also includes first and second generally U-shaped wall portions 62 and 63 having their lower ends disposed closely adjacent the upper face of disk 40. The wall portions 62 and 63 are held stationary and, as shown, are supported by brackets 67 on the wall portions 46 and 47 of the outer flow divider. The ends 62a, 62b and 63a, 63b of the wall portions 62 and 63 are spaced apart to provide flow divider openings 64 and 65 therebetween. The several materials to be spread are deposited on the disk inwardly of the inner flow divider casing and the openings 64 and 65 are constructed and arranged, as more specifically described hereinafter, relative to the disk areas on which the material is deposited so as to divide the flow of each of the materials delivered to the inner flow divider and pass mixtures of the two materials through each of the openings 64 and 65 to the outer flow divider means.

A guide chute, generally designated 71, is arranged to guide the two different materials delivered by the feed conveyors 32 and 32′ to separate areas at diametrically opposite sides of the axis of rotation of disk 40. The outer flow divider is conveniently supported on the guide chute, as by brackets 70. In general, the chute 71 underlies the outlet of the feed conveyors 32 and 32′ and includes front and rear walls 72 and 73 and downwardly converging side walls 74 and 75 for respectively guiding material from the feed conveyors laterally of the vehicle to a central outlet opening within the inner flow divider casing. For reasons pointed out hereinafter, it is desired to deposit the several materials in definite localized areas on the disk within the inner flow divider and for this purpose, V-shaped material guide panels 77 and 78 are provided on the lower portions of the side walls 74 and 75 of the chute to confine the flow of material into a narrow stream. In this embodiment, the apexes of the V-shaped guide panels 77 and 78 are disposed in a vertical plane through the axis of rotation of the disk 40 and generally perpendicular to the path of movement of the vehicle. As shown in FIG. 3, the apexes 77a and 78a of the V-shaped guide members at the adjacent ends thereof are spaced radially from the axis of rotation substantially equal amounts so as to guide the separate materials onto the disk at diametrically opposite points indicated at X1 and X2 in FIG. 4. Panels 79 and 80 are provided in the upper portion of the guide chute for guiding the material from the respective conveyors laterally into the lower V-shaped guides 77 and 78. In order to facilitate flow of the material down the apex of the V-shaped guides 77 and 78, it is preferable to feed the material from the conveyors 32 and 32′ to a point such that the material drops adjacent the plane of the apexes of the V-shaped guides. The guide chutes are preferably narrow in a front-to-rear direction in order to laterally concentrate the streams of material delivered onto disk 40.

When particulate material is deposited on a rotating disk at a point radially offset from the axis, the particles tend to travel outwardly and in the direction of rotation along a curve approximating a logarithmic spiral. All particles dropped even on the same point, however, will not travel along an identical curve, due to differences in weight, size, shape and further dependent upon whether the particles are in direct contact with the disk or are riding on other material which contacts the disk. In general, material deposited at a point such as X1 in FIG. 4 will pass outwardly in a spiral flow indicated generally by phantom lines Y1 and, similarly, material deposited at a second point X2 will pass outwardly and in the direction of rotation in a flow pattern indicated at Z1. The openings 64 and 65 in the flow divider are angularly and radially related to the points X2 and X1 respectively such that only a portion of the material deposited at X2 passes through opening 64 and the remainder is carried along wall 62 to opening 65. Similarly, opening 65 is located with relation to point X1 so that only a portion of the material deposited at X1 passes out through opening 65 and the remaining portion is carried to opening 64. Preferably, the openings 64 and 65 are positioned with relation to the locations X2 and X1 respectively such that a substantial portion of the material deposited at these locations spirals outwardly as at Y1 and Z1 and through openings 64 and 65 without contacting walls 62 and 63.

Preferably one end 63a of wall 63 is positioned to extend into spiral stream Y1 and guide approximately one-half of that material around to the other opening 64 and, similarly, one end 62a of the wall 62 is preferably positioned to extend into the spiral stream Z1 and guide approximately one-half of that stream to the opening 65. In this manner, the separate materials deposited at X2 and X1 are divided and portions of each discharged through both openings 64 and 65 to provide mixed streams issuing from the inner flow divider. As previously described, outlet openings 48 and 49 in the outer material flow divider 45 are also arranged so that only a portion of the material on the disk at it passes each outlet opening 48 and 49 passes through that opening and the remaining material is carried on the disk to the next outlet opening. This arrangement substantially compensates for any deviation in the desired 50–50 division of material passing from inner flow divider openings 64 and 65. As shown in FIGS. 2 and 4, edges 46a and 47b and edges 46b and 47a are circumferentially spaced apart. Material moving along wall portions 46 and 47 tends to move generally tangent to these wall portions as it moves across the respective openings 49 and 48 and the lead edges 46a and 47a of the walls 46 and 47 are arranged to extend to a point which preferably bisects the generally tangent flow of material at the outlet openings 48 and 49. As shown in FIG. 4, the lead edges 46a and 47a of the walls 46 and 47 are respectively located along lines tangent to points indicated at M and N, and which preferably approximately bisect the space between the outer and inner flow dividers at ends 47b and 46b. The radial spacing between the wall portions of the inner and outer flow dividers, in the region adjacent the openings 48 and 49, is preferably selected so that, even when the spreader apparatus is operated to distribute material at relatively low rates, the material being spread is sufficient to substantially cover the disk between the walls of the inner and outer flow dividers. Accordingly, locating the edges 47a and 46a along tangent lines that bisect the space between the inner and outer flow dividers will approximately bisect the streams of material carried on the disk as it passes the openings 48 and 49. Centrifugal force will tend to cause the material to build up somewhat higher adjacent the radially outer wall portions 46 and 47 than adjacent the flow divider wall portions 62 and 63. However, this effect is significant only at very low distribution rates in which the material is not sufficient to at least cover the disk between the inner and outer wall portions. At such very low distribution rates, somewhat more than half of the material carried on the disk will pass out through the respective openings 48 and 49 and somewhat less than half of the material will be carried around to the next opening. However, the amount of carry over need not be exactly fifty percent and this carry over, so long as it is substantial, will substantially compensate for deviations in the desired 50—50 division of the materials achieved in the inner flow divider. At higher distribution rates, the material being spread has a substantial depth as it passes between the wall portions of the inner and outer flow dividers and centrifugal build-up is not significant. As can be seen, the material which is carried over from one of the outlet openings such as 48 along the wall 46 will mix with the material discharged from the opening 64 in the inner flow divider and this mixed material is carried to the next opening 49. In order to assure mixing of the material carried over from the outer flow divider with the material emerging from the openings in the inner material flow divider, outer flow divider openings 48 and 49 are angularly related to outlet openings 64 and 65 of the inner flow divider such that the material from the inner flow divider openings does not pass directly through the outlet openings 48 and 49 but instead strikes the wall portions 46 and 47 to be carried to the next succeeding outlet opening.

The apparatus previously described is also adapted for use in mixing or blending several materials. As shown in FIGS. 3 and 4, the apparatus is converted for use in blending the several particulate materials and for conveying the blended material to a common outlet as for bagging or spreading by another spreader apparatus (not shown). As shown, ring 37 is removed from its attachment to disk 40 which advantageously extends outwardly to a point adjacent the outer flow divider walls 46 and 47. As previously described, material is delivered into the chute 71 by the several material feed conveyors 32 and 32' from their respective hoppers and is deposited at angularly spaced locations X1 and X2 from where it spirals outwardly along flow paths Y1 and Z1. Ends 62a and 63a extend into streams Z1 and Y1 to guide a portion of each stream to the other opening 65 or 64. The walls 46 and 47 are positioned to guide the material from openings 64 and 65 around to the outlet openings 49 and 48, respectively. End 46a of wall 46 is arranged to extend into the path of the material on the disk between wall portions 47 and 63 so that one portion of that material passes through opening 48 and the remainder is guided by wall 46 to opening 49. Similarly, end 47a of wall 47 guides a portion of the material around to opening 48. The inner flow divider thus divides the streams Y1 and Z1 and delivers mixed streams to the outer flow divider and the outer flow divider again divides the mixed streams and delivers portions of the divided mixed streams to both outlets 48 and 49. This produces a uniform blending of the several materials.

The blended or mixed material from the outlets 48 and 49 is collected by a housing or shroud 161 detachably mounted on material flow divider 45 and extending around the blending apparatus outwardly of disk 40. The mounting on the material flow divider is quickly and conveniently accomplished by means of a rod 159 adjacent the top of housing 161 for overlying and engaging the top of wall 46 or 47, and by means of a spring coupling 158 for hooking on wall 46 or 47. The housing is preferably formed with a hopper-like bottom 162 which conveys the material to a bottom outlet 163 and a means such as a screw conveyor 164 is advantageously provided for elevating and conveying the blended material to a discharge outlet 165. The screw conveyor advantageously includes an auger 166 driven by motor 168. A funnel 169 is arranged to receive material flowing through opening 163 and to feed the material to auger 166. The screw conveyor is advantageously supported in operative position (FIG. 1) by means of hooks 171 slidably engaged with a semicircular support 172 on the truck and by a line or chain 173 extending from a hook 174 on the screw conveyor to a connector 175 on a frame, generally designated 176. It is contemplated that the mounting arrangement be adjustable so that outlet 165 may be raised or lowered, as desired. The frame 176 is swingable from a lateral storage position (FIG. 1-A) to an operative position (FIG. 1). In the storage position, the screw conveyor 164 is conveniently supported on an apron 10 on the hopper. A stop and latch 177 is provided to hold the frame in the operative position. Thus one man can easily convert the apparatus and swing the screw conveyor into position. When in the operative position, connector 175 is advantageously vertically aligned with shaft 42 and shaft 42 is also advantageously the radius point of support 172. As can be seen, funnel 169 is vertically below shaft 42 and thus the outlet end of the screw conveyor is swingable while the funnel remains in the proper position. With this arrangement, the vehicle can be employed to transport the several separated materials to a point of use, and the apparatus then used to fill a hopper on a separate spreader device or other containers with mixed materials. Conveyors 32 and 32' can be operated when the vehicle is stopped, as will hereinafter be described, and gates 96 and 96' (FIG. 1-A) adjusted to deliver the several materials in the desired proportions. The blending apparatus operates to intimately mix the several materials in the proportions fed thereto and to deliver the blended materials to a common outlet. The blending apparatus can of course be easily reconvertd for use as a spreader by removing the housing 161 and attaching the previously described spreader ring 37 to disk 40.

In many spreading applications, it is desirable to correlate the amount spread with vehicle speed so as to maintain a uniform amount of material spread. A conveyor drive apparatus, preferably of the type disclosed in the copending application of Burl A. Wilder, Eskil W. Swenson and Clas O. F. Fyrk, Ser. No. 448,108, filed Apr. 14, 1965, now abandoned in favor of the continuation-in-part application, Ser. No. 522,078, filed Jan. 21, 1966, now Patent No. 3,344,993, is advantageously employed to drive the spreader apparatus. However, the present apparatus is designed for blending and spreading plural materials and, in some applications, it is desirable to spread only one of the materials. An improved drive is accordingly provided which will enable driving either one or both of the conveyors at a speed correlative with vehicle speed. A control circuit is diagrammatically illustrated in FIG. 5 and, as shown, includes a pump 101 having its inlet connected to a reservoir 102 and its outlet connected through a manually operated valve 103 which is selectively movable between the position shown delivering fluid to a control line 104 and a second position delivering fluid to a by-pass line 105 leading to the reservoir. An adjustable valve 108, preferably of the pressure compensated flow control type, has its inlet connected to the line 104 and a controlled outlet 109 connected through a line 111 to hydraulic drive motor 43, the motor being connected through a return line 112 to the reservoir. Valve 108 can be of any of several commercially available types and has an adjustable orifice between the inlet 104 and outlet 109 controlled as by a knob 114 and a pressure operated valve mechanism for controlling flow to controlled outlet 109 and responsive to the pressure differential across the orifice to maintain a preselected pressure drop thereacross and hence to maintain a flow through outlet 109 determined by the setting of the orifice and substantially independent of the inlet and outlet pressures in the system. In this manner, the speed of the disk and broadcast member can be preset and accurately maintained at that speed, substantially independent of the speed of the vehicle and pump. The pressure compensated valve also has a by-pass outlet 115 which, as shown, is conveniently connected to a feed conveyor control valve 116. The conveyors 32 and 32' are preferably driven by separate hydraulic motors 118 and 118' which are preferably connected in series with each other and to valve 116 as by conduits 121 and 122 and return conduit 123. In this manner, a single valve is operable to control both conveyors. Alternatively, separate valves could be employed. To enable selective operation of either one or the other of the hydraulic motors and conveyors, by-pass valves 126 and 126' are provided for respectively by-passing hydraulic motors 118 and 118'. To simplify illustration, the by-pass valves are shown adjacent the respective motors 118 and 118', it being understood that they could be located at any convenient location, for example, in the vehicle cab.

As disclosed in the aforementioned application of Wilder et al., the control means for maintaining a preselected ratio between the speed of the convoyer and the speed of the truck includes a first sensing means responsive to the speed of the truck, a second sensing means responsive to the speed of the conveyor and a third means responsive to the first and second sensing means for maintaining a preselected ratio between the speed of the truck and the speed of the conveyor by adjusting the flow control valve 116. In order to simplify the apparatus for spreading multiple materials, a single sensing means indicated at 131 is provided for sensing the speed of the truck and a second sensing means is provided and so arranged to sense the speed of rotation of whichever conveyor is in operation. A third sensing means 133 is responsive to the first and second sensing means and operates the valve 116. The third sensing means 133 can conveniently be in the form of a mechanical differential having one input shaft 134, a second input shaft 135, herein shown extending from opposite sides of the differential 133, and an output shaft 136 which is rotated in a direction and magnitude corresponding to the difference in the speeds of the shafts 134 and 135. Input shaft 134 is connected through a sprocket 138, chain 139 and sprocket 141 to a sensing wheel 142 mounted on the end of an arm 140 for engagement with the vehicle wheel 12. One end of the shaft 135 is connected, as through a one-way clutch 143, to a shaft 144 driven by a conveyor drive speed reducer 119' and the other end of the shaft 135 is connected, as through a one-way clutch 146, sprocket 147, chain 148 and sprocket 149, to a shaft 151 driven by another conveyor speed reducer 119. The one-way clutches 143 and 146 are of conventional construction and are so arranged as to establish a driving connection from shaft 144 to shaft 135 when shaft 144 is rotated in a direction to advance conveyor 32', and clutch 146 is arranged so as to establish a driving connection to shaft 135 when the other conveyor 32 is driven. With this arrangement, shaft 135 is driven whenever either one or the other or both of the conveyors are driven.

The aforedescribed conveyor drive will operate one or both conveyors at a speed correlative with the speed of the vehicle to maintain the amount of material spread along a path uniform, independent of vehicle speed. Provision is made for adjusting the relative amounts of the several materials to be spread and, while this can be achieved by changing the relative speeds at which the conveyors are operated, it is conveniently accomplished by using adjustable flow control gates. As shown in FIG. 1-A, the end wall 27 is provided with discharge openings 95 and 95' and gates 96 and 96' to regulate the effective size of the discharge openings. In this manner, the amounts of each material to be spread along the path can be selectively and independently preset. An adjustable valve 119a (FIG. 5) connected by a line 120 to by-pass the valve 116 is advantageously provided to enable operation of the conveyors when the vehicle is stopped, as for use in blending alone. FIG. 5-A illustrates a portion of the hydraulic controls of FIG. 5. A quick disconnect coupling (not shown) is conveniently provided to disconnect line 111 from spinner motor 43. A conduit or line 111a is connected to line 111 and leads to screw conveyor motor 168. Line 111b is connected to spinner motor 43 to complete the circuit with the motors 43 and 168 in series. This provides a convenient connection for motor 168 and assures that it will be run fast enough to carry away the material discharged from the spinner disk 40. Obviously, the motor 168 could be otherwise connected in the hydraulic circuit.

While the embodiment disclosed illustrates two material feed conveyors for feeding two different materials into the blending apparatus, it is apparent that additional materials can be simultaneously mixed or blended by feeding the additional materials into the guide chute in such a manner that the materials are deposited on the disk at one or both of the two locations indicated above.

From the foregoing it is thought that the construction and operation of the device as a mixing and spreading apparatus will be readily understood. Both conveyors 32 and 32' can be operated simultaneously to feed materials into the guide chute 71, which deposits the several materials on diametrically opposite locations on the disk, inwardly of the inner flow divider. The openings in the inner flow divider are so arranged with respect to the locations on which the material is deposited that only a portion of each material passes out through each opening and the other portion is carried around by the inner flow divider walls to the other opening. Similarly the outlet openings in the outer flow divider means are so arranged that only a portion of the material carried between the outer and inner flow dividers passes out through the outlet openings 48 and 49 and the other portion is carried around to the other outlet opening. The aforedescribed carry-over of material in each inner and outer flow divider divides and mixes each of the materials several times before it is discharged. Thus the mixed or blended material is fed to the screw conveyor or is delivered in two mixed streams to the impellers on the broadcast ring.

What is claimed is:

1. A convertible mixing and spreading apparatus for use on a vehicle and including: a rotary member mounted on the vehicle and having a generally flat upper face, means for rotating the rotary member with its upper face in a generally horizontal plane, storage means on the vehicle for separately storing at least two different particulate materials, means for simultaneously feeding materials from the storage means to the upper face of the rotary member at first and second spaced locations, stationary flow divider means defining first and second wall portions disposed on opposite sides of the axis of rotation of the rotary member and having their lower edges extending closely adjacent the upper face of the rotary member outwardly of said two locations, said wall portions having their ends spaced apart to define first and second openings, the rotation causing the material deposited at said first and second locations to travel outwardly and in the direction of rotation respectively toward the first and second openings, the first wall portion having one end extending into the path of travel of the material deposited at said first location for guiding a portion of that material to said second opening and said second wall portion having one end extending into the path of travel of the material deposited at said second location for guiding a portion of that material to said first opening whereby the material discharged through each opening is a mix of the material deposited at said first and second location, impeller means removably mounted outwardly of said flow divider means for rotation about said axis for spreading material discharged from said openings, and means for collecting material from said openings and for conveying the material to a common discharge and removably mounted on the apparatus for operation when the impeller means is removed, whereby the impeller means and last-mentioned means are selectively mounted for operation.

2. A convertible mixing and spreading apparatus as set forth in claim 1 wherein the impeller means includes a plate having a plurality of vanes attached thereto and disposed outwardly of the flow divider means, and means for removably mounting the plate to said rotary member for rotation therewith.

3. A convertible mixing and spreading apparatus as set forth in claim 1 wherein the last-mentioned means includes a housing mounted in spaced relationship to said rotary member, a chute portion connected to the lower end of the housing and having a discharge opening adjacent the bottom thereof, and conveyor means for conveying the mixed material from the chute discharge opening to a spaced discharge point.

4. A convertible mixing and spreading apparatus as set forth in claim 3 wherein the spaced discharge point is at a level above the chute discharge opening, and the conveyor means includes an auger generally extending from the chute discharge opening to the spaced discharge point, and means for rotating the auger.

5. A convertible mixing and spreading apparatus as set forth in claim 1 wherein the first and second wall portions are arranged to guide approximately one-half of the material deposited at each first and second location to the respective second and first openings.

6. A convertible mixing and spreading apparatus as set forth in claim 1 and including: second stationary flow divider means defining third and fourth wall portions disposed outwardly from the first flow divider means and at opposite sides of said axis, said third and fourth wall portions having their ends spaced apart to define third and fourth openings and having their lower edges extending closely adjacent the upper face of the rotary member, said third wall portion being disposed crosswise of the path of flow of material from said second opening to guide the material therefrom toward said third opening and said fourth wall portion being disposed crosswise of the path of flow of material from said first opening to guide material therefrom toward said fourth opening.

7. A convertible mixing and spreading apparatus as set forth in claim 6 wherein said third wall portion has one end thereof extending into the path of flow of the material carried on the rotary member between said first and second flow divider means as it passes said fourth opening to guide a portion of that material to said third opening, and said fourth wall portion has one end thereof extending into the path of flow passing said third opening to guide a portion of that material to said fourth opening.

8. A convertible mixing and spreading apparatus as set forth in claim 7 wherein said one end of each wall is located so that the portion of material guided is approximately one-half in each instance.

9. A convertible mixing and spreading apparatus as set forth in claim 7 wherein the walls are arcuate, and the first and second walls are spaced from the axis generally at one radial distance and the third and fourth walls are spaced from the axis generally at a second radial distance.

10. A convertible mixing and spreading apparatus as set forth in claim 9 wherein: the impeller means includes a ring having a plurality of vanes attached thereto and disposed outwardly of the second flow divider means, means for removably mounting the ring to said rotary member for rotation therewith, and wherein the means for collecting and conveying the material includes a housing mounted in spaced relationship to said rotary member and surrounding the flow-divider means, a chute portion depending from the housing and having a discharge opening adjacent the bottom thereof, an auger and auger housing extending from the chute discharge opening to a discharge point at a level thereabove, and means for rotating the auger.

11. A convertible mixing and spreading apparatus for use on a vehicle and including: a member mounted on the vehicle and having a generally flat upper face, means for rotating said member about a generally upright axis with its upper face in a generally horizontal plane, storage means on the vehicle for separately storing at least two different particulate materials, means for simultaneously feeding materials from the storage means to the upper face of the rotating member, the rotation of said member causing the material deposited on the upper face to travel outwardly and in the direction of rotation, impeller means removably mounted outwardly of said member for rotation about said axis simultaneously with the rotation of said member for spreading the materials discharged from the generally flat upper face, means for collecting the materials discharged from the generally flat upper face of the rotating member and for conveying the materials to a common discharge, and said last-mentioned means being removably mounted adjacent said member for operation when the impeller means is removed, whereby the impeller means and the last-mentioned means are selectively mounted for operation.

12. A convertible mixing and spreading aparatus as set forth in claim 11 wherein the means for collecting and conveying the material includes a housing removably mounted in spaced relationship to the rotary member and having a discharge opening adjacent the bottom thereof, and conveyor means disposed beneath the housing discharge opening for conveying the materials therefrom to an elevated conveyor discharge point.

13. A convertible mixing and spreading apparatus as set forth in claim 12 wherein the conveyor means includes a funnel disposed below said housing discharge opening, and including means for mounting the conveyor means for swinging movement substantially about said axis of rotation with the funnel remaining in position below the housing discharge opening and the conveyor discharge point movable through an arc about said axis.

14. A convertible mixing and spreading apparatus as set forth in claim 13 wherein the means for mounting the conveyor means includes a frame mounted on the vehicle for swinging movement about a generally upright axis offset from said axis of rotation, said frame having an outer end and support means at the outer end and attached to the conveyor means, means for holding the frame in one position with the support means above the rotary member and generally aligned with the axis of rotation and releasable for swinging movement of the frame to another position with the support means disposed at a side of the vehicle.

15. A convertible mixing and spreading apparatus for use on a vehicle and including: a member on the vehicle and having a generally flat upper face, means for rotating the member about a generally upright axis and with the upper face in a generally horizontal plane, storage means on the vehicle for separately storing at least two different particulate materials, means for simultaneously feeding materials from the storage means to the upper face of the rotating member, the rotation of said member causing the material deposited on the upper face to travel in the direction of rotation and outwardly for discharge from said member, a plurality of impellers mounted for rotation with said member and extending outwardly from said member for spreading the materials discharged from the generally flat upper face, a housing removably mounted in spaced relationship to said member, and extending to a point above the upper face thereof, said housing having a discharge opening adjacent the bottom thereof, and conveyor means for conveying the materials from the housing to a conveyor discharge point, whereby the apparatus is selectively operable for spreading the materials and for conveying the materials to said discharge point.

References Cited

UNITED STATES PATENTS 2,550,872  5/1951  Shaw _____ 239—687
2,692,702  10/1954  Church _____ 222—410

RICHARD E. AEGERTER, *Primary Examiner.*

U. S. Cl. X.R.

214—46; 222—410; 239—687; 259—2